United States Patent [19]

Van der Geer et al.

[11] 4,337,410
[45] Jun. 29, 1982

[54] CATHODE-RAY TUBE FACE-PLATE

[75] Inventors: Josephus J. Van der Geer; Willem Van Pelt; Marinus Ploeger; Wilhelmus J. Spoor; Gerardus H. A. M. Van der Steen, all of Eindhoven, Netherlands

[73] Assignee: U.S. Philips Corporation, New York, N.Y.

[21] Appl. No.: 183,480

[22] Filed: Sep. 2, 1980

[30] Foreign Application Priority Data

Sep. 3, 1979 [NL] Netherlands ......................... 7906579

[51] Int. Cl.$^3$ ........................... C03C 3/10; H01J 31/00
[52] U.S. Cl. ...................................... 313/480; 501/60; 501/62; 501/64; 501/69; 501/70; 501/71; 501/72
[58] Field of Search ................... 106/52, 53; 313/480; 501/60, 62, 64, 69, 70, 71, 72

[56] References Cited

U.S. PATENT DOCUMENTS

| | | | |
|---|---|---|---|
| 3,725,710 | 4/1973 | de Gier et al. | 313/480 X |
| 3,925,089 | 12/1975 | Houben | 106/52 X |
| 3,987,330 | 10/1976 | Shell | 106/53 X |
| 4,015,966 | 4/1977 | Weaver | 106/52 X |
| 4,065,317 | 12/1977 | Baak et al. | 106/53 X |
| 4,277,286 | 7/1981 | Boyd | 313/480 X |

FOREIGN PATENT DOCUMENTS

| | | | |
|---|---|---|---|
| 51-71314 | 6/1976 | Japan | 501/62 |
| 52-102312 | 8/1977 | Japan | |

*Primary Examiner*—Helen M. McCarthy
*Attorney, Agent, or Firm*—Robert J. Kraus

[57] ABSTRACT

Glass compositions which are suitable for making faceplates of cathode-ray tubes used for displaying television pictures, particularly for displaying color television pictures. A problem in formulating such glasses is to obtain glasses which can be worked satisfactorily and which do not discolor significantly as a result of electron bombardment and X-ray irradiation. The glass compositions consist of the following constituents in the following quantities (expressed in % by weight):

| | | | |
|---|---|---|---|
| $SiO_2$ | 57–65 | $ZrO_2$ | 1–4 |
| $Al_2O_3$ | 0–4 | SrO | 6–14 |
| $Na_2O$ | 5.5–8.0 | PbO | 0–1 |
| $K_2O$ | 7.5–10.0 | $Sb_2O_3 + As_2O_3$ | 0–2 |
| MgO | 0–4 | $TiO_2$ | 0.2–2.0 |
| CaO | 0–4 | $CeO_2$ | 0.05–1.0 | wherein wt. % $Na_2O$/(wt. % $Na_2O$+wt. % $K_2O$)=0.40-0.47 and wt. % BaO+2 wt. % SrO+2 wt. % $ZrO_2$+3 wt. % PbO>32.

6 Claims, No Drawings

CATHODE-RAY TUBE FACE-PLATE

BACKGROUND OF THE INVENTION

The invention relates to glass compositions which are suitable for making face-plates of cathode-ray tubes used for displaying television pictures, particularly for displaying colour television pictures, to a cathode-ray tube face-plate consisting of such a glass, and to a cathode-ray tube for displaying colour television pictures and having such a face-plate.

Glasses for cathode-ray tube screens must inter alia satisfy the following requirements: a high degree of absorption of electromagnetic radiation, no discoloration by electron beams and a proper fusibility. Chemical Abstracts 88, 175983 s, (1978) discloses a glass which offers a satisfactory compromise as regards the above-mentioned requirements. The known glass contains 58–65 $SiO_2$; 0.5–0.8 $Al_2O_3$; 6–9.5 $Na_2O$; 7–10 $K_2O$; $MgO \leq 3$; $CaO \leq 3$; SrO 8–10; BaO 3–7; $ZrO_2$ 2–5; $F \leq 1$; $CeO_2$ 0.1–0.5 and $Sb_2O_3 + As_2O_3 \leq 1$. This glass is very satisfactory as regards X-ray absorption. However, as regards discoloration by electron bombardment there is still room for improvement. The known glass contains F which is unwanted as it is detrimental to the environment.

SUMMARY OF THE INVENTION

The invention provides a glass which consists of the following constituents (expressed in percent by weight) in the following quantities:

| | | | |
|---|---|---|---|
| $SiO_2$ | 57–65 | $ZrO_2$ | 1–4 |
| $Al_2O_3$ | 0–4 | SrO | 6–14 |
| $Na_2O$ | 5.5–8.0 | PbO | 0–1 |
| $K_2O$ | 7.5–10.0 | $Sb_2O_3$ | 0–2 |
| MgO | 0–4 | $As_2O_3^+$ | |
| CaO | 0–4 | $TiO_2$ | 0.2–2.0 |
| BaO | 5–13 | $CeO_2$ | 0.05–1.0 | wherein wt.% $Na_2O$/(wt.% $Na_2O$ + wt.% $K_2O$) = 0.40–0.47 and wt.% BaO + 2 times wt.% SrO + 2 times wt.% $ZrO_2$ + +3 times wt.% PbO is more than 32%.

The glasses according to the invention have a high degree of absorption for X-ray radiation because of the high Ba-equivalent ($Ba_{eq}$ = wt.% BaO + 2 times wt.% SrO + 2 times wt.% $ZrO_2$ + 3 times wt.% PbO). These glasses are satisfactorily fusible, in spite of the absence of F.

Related glasses with a similar $Ba_{eq}$ are known per se from U.S. Pat. No. 3,987,330 and the German Auslegeschrift No. 2,433,752. However, these glasses contain a relatively large quantity of PbO (1–5 and 2.5–3.5% by weight, respectively). However, a high PbO content results in a high degree of discoloration when subjected to electron bombardment (see M. Ishimaya et al, Browning of Glass by electron bombardment, Congres Kyoto, Japan 1979).

The last-mentioned publication also states that sodium oxide and potassium oxide increase the tendency to discoloration by electron beams (potassium oxide increases this tendency more than sodium oxide). During the investigations which led to the present invention, it was surprisingly found that glasses which are less sensitive to discoloration are obtained with a certain ratio of the $Na_2O$ to $K_2O$. A low PbO content up to 1% by weight PbO, or preferably 0% PbO decreases the tendency to discoloration also. The ratio between $Na_2O$ and $K_2O$ for a given total quantity of $Na_2O + K_2O$ is also important for the fusibility of the glass, so that ultimately a value which is the optimum value for practical purposes must be chosen: $Na_2O/(Na_2O + K_2O) = 0.4–0.47$.

DESCRIPTION OF THE PREFERRED EMBODIMENTS

Preferably, the glass according to the invention has a composition which contains the following constituents, expressed in a percentage by weight:

| | | | |
|---|---|---|---|
| $SiO_2$ | 59–62 | $ZrO_2$ | 1.5–2.5 |
| $Al_2O_3$ | 0.2–2.0 | SrO | 9–12 |
| $Na_2O$ | 5.5–8.0 | PbO | 0 |
| $K_2O$ | 7.5–10.0 | $Sb_2O_3$ | 0–1.0 $As_2O_3$ O |
| MgO | 0–2.0 | $TiO_2$ | 0.1–1.0 |
| CaO | 0–2.0 | $CeO_2$ | 0.05–0.5 |
| BaO | 8–10.0 | | | wherein wt.% $Na_2O$/(wt.% $Na_2O$ + wt.% $K_2O$) = 0.42–0.45. Such a composition has a minimum sensitivity to discoloration by electron bombardment.

It is, of course, possible to add further constituents to the glass. Some NiO and/or CoO may be, for example, added to obtain a predetermined colour. It is, alternatively, possible to replace a portion of the alkali metals by $Li_2O$.

The $SiO_2$ content of the glass according to the invention is limited to 57–65% by weight, preferably 59–62% by weight. In combination with the other constituents these contents result in a properly fusible glass which can be satisfactorily pressed.

The $Al_2O_3$ content is limited to 0–4% by weight, preferably 0.2–2.0% by weight. The $Al_2O_3$ is added to suppress the tendency of the glass to crystallize. $Al_2O_3$ contents of over 4% by weight result in undesired viscosity properties.

In view of the fusibility and the discoloration properties, the $Na_2O$ content is limited to 5.5–8.0% by weight and the $K_2O$ content to 7.5–10.0% by weight.

MgO and CaO may be present in a content of 0–4 each, preferably 0–2.0% by weight. Contents over 4% by weight cause the viscosity to vary too steeply as a function of the temperature. The BaO content is 5–13, preferably 8–10% by weight. BaO contents over 13% by weight result in an unstable glass, contents less than 5% by weight result in too low an X-ray absorption.

The $ZrO_2$ content is 1–4, preferably 1.5–2.5% by weight. A $ZrO_2$ content of more than 4% by weight, results in a glass which is less satisfactorily fusible. A lower limit of 1% by weight is necessary for the X-ray absorption.

The glass according to the invention contains 6–14, preferably 9–12% by weight of SrO. In view of the X-ray absorption, a minimum quantity of 6% by weight of SrO must be present. A quantity of over 12% by weight of SrO is impermissible in view of the crystallization of the glass then occurring.

The lead content of the glass is 0–1, preferably 0% by weight PbO. PbO makes the glass more sensitive to discoloration by electron bombardment.

$Sb_2O_3$ and $As_2O_3$ are added as a refining agent in the usual concentrations: $Sb_2O_3 + As_2O_3$ 0–2% by weight. Preferably, no $As_2O_3$ is used at all (environmental pollution) and the $Sb_2O_3$ content is limited to 0–1% by weight.

$CeO_2$ and $TiO_2$ are added to prevent discoloration by X-ray radiation. A $TiO_2$ content of 0.2–2.0, preferably 0.1–1.0% by weight and a $CeO_2$ content of 0.05–1.0, preferably 0.05–0.5% by weight, are used for this purpose.

Some embodiments of the invention will now be described with reference to the following Examples. For reasons of comparison the properties of some commercially available glasses for the screens of colour television tubes are included in the Tables.

EXAMPLES

Glasses (1, 2 and 3) according to the invention and glasses A and B (commercially available screen glasses) were tested. Table I shows the composition of the glasses (values determined by analysis).

TABLE I

| | (wt. %) | | | | |
|---|---|---|---|---|---|
| | Glasses according to the invention | | | Commercially available glasses | |
| | 1 | 2 | 3 | A | B |
| $SiO_2$ | 60.64 | 60.34 | 59.8 | 63 | 59.7 |
| $Al_2O_3$ | 0.66 | 0.66 | 0.66 | 2.2 | 2.0 |
| $Na_2O$ | 6.6 | 6.6 | 6.8 | 7.2 | 8.3 |
| $K_2O$ | 8.6 | 8.6 | 7.8 | 8.7 | 7.1 |
| MgO | 0.3 | 0.3 | 0.3 | 1.0 | 0.5 |
| CaO | 0.4 | 0.4 | 0.4 | 1.8 | 1.8 |
| BaO | 9.0 | 9.0 | 9.3 | 2.5 | 5.9 |
| $ZrO_2$ | 2.1 | 2.1 | 2.2 | 0 | 3.1 |
| SrO | 10.4 | 10.4 | 10.7 | 10.4 | 10.6 |
| PbO | 0 | 0.3 | 0.3 | 2.2 | 0 |
| $Sb_2O_3$ | 0.55 | 0.55 | 0.55 | 0.3 | 0.3 |
| $As_2O_3$ | 0 | 0 | 0 | 0.2 | 0 |
| $TiO_2$ | 0.45 | 0.45 | 0.45 | 0.5 | 0.5 |
| $CeO_2$ | 0.2 | 0.2 | 0.2 | 0.15 | not determined |
| F | 0 | 0 | 0 | 0.3 | 1.3 |
| $Na_2O/(Na_2O + K_2O)$ | 0.43 | 0.43 | 0.47 | 0.46 | 0.54 |
| *$Ba_{eq}$ | 34 | 34.9 | 36.0 | 29.9 | 33.3 |

*$Ba_{eq}$ = % BaO + 2 times % $ZrO_2$ + 2 times % SrO + 3 times % PbO.

The following values were inter alia determined of the glasses 1, 2 and 3, A and B: "A.P." (the annealing point which is the temperature at which the viscosity has a value of $10^{14.6}$ poises), "S.P." (Littleton softening point, at which the viscosity is $10^{7.6}$ poises) and working temperature (at which the viscosity is $10^4$ poises). The discoloration was determined by means of a simulation test. In this test twelve Al-coated samples were disposed in a holder and the holder was placed in a television tube at the place where normally the mask of the tube is located (that is to say inside of the tube adjacent to the screen). No phosphors had been applied to the samples. The samples were scanned with an electron beam (25.0 kV; current density: 0.93 $\mu A/cm^2$ for 168 hours in circumstances which are normal for a colour television tube. The difference in the optical density at 400 nm prior to and after electron beam scanning was determined as a measure of the degree of discoloration. Thereafter, the samples were polished in order to remove the 20 $\mu m$ thick layer which was discoloured as a result of the electron bombardment. Thereafter, the residual discoloration, causes by X-ray radiation, was measured by a subsequent determination of the optical density. The difference in optical density prior to and after polishing was defined as the "discoloration" (as a result of the electron bombardment).

The results are summarized in Table II.

TABLE II

| glass | 1 | 2 | 3 | A | B |
|---|---|---|---|---|---|
| A.P. (°C.) | 482 | 482 | 475 | 476 | 486 |
| S.P. (°C.) | 700 | 700 | 705 | 695 | 689 |
| Working temp. (°C.) | 1010 | 1010 | 1012 | 1005 | 1005 |
| Discoloration | 0.36 | 0.70 | 1.08 | 1.35 | 1.22 |

It will be apparent from Table II that the glasses according to the invention were discoloured to a lesser extent than the commercially available glasses A and B. A small addition (0.3% by weight) of PbO results in an increase of the discoloration (cf. glasses 1 and 2). A glass having a PbO content of 2.2% by weight and a $Na_2O/(Na_2O+K_2O)$ ratio of 0.46 discoloured to a very high extent (glass A). Glass B (without PbO) but having a $Na_2O/(Na_2+K_2O)$ ratio of 0.54 also evidences a high degree of discoloration.

What is claimed is:

1. A fluorine-free glass consisting essentially of the following constituents in the following quantities (expressed in percent by weight):

| | | | |
|---|---|---|---|
| $SiO_2$ | 59–62 | $ZrO_2$ | 1.5–2.5 |
| $Al_2O_3$ | 0.2–2.0 | SrO | 9–12 |
| $Na_2O$ | 5.5–8.0 | PbO | 0 |
| $K_2O$ | 7.5–10.0 | $Sb_2O_3$ | 0–1.0 $As_2O_3$ O |
| MgO | 0–2.0 | $TiO_2$ | 0.1–1.0 |
| CaO | 0–2.0 | $CeO_2$ | 0.05–0.5 |
| BaO | 8–10.0 | | | wherein wt.% $Na_2O$/(wt.% $Na_2O$+wt.% $K_2O$)=0.42–0.45.

2. A cathode-ray tube face-plate comprising a glass as in claim 1.

3. A cathode-ray tube for displaying colour television pictures having a cathode-ray tube face-plate as in claim 2.

4. A glass as in claim 1, comprising the following constituents in the following quantities (expressed in percent by weight):

| | | | |
|---|---|---|---|
| $SiO_2$ | 60.64 | $ZrO_2$ | 2.1 |
| $Al_2O_3$ | 0.66 | SrO | 10.4 |
| $Na_2O$ | 6.6 | PbO | 0 |
| $K_2O$ | 8.6 | $Sb_2O_3$ | 0.55 |
| MgO | 0.3 | $As_2O_3$ | 0 |
| CaO | 0.4 | $TiO_2$ | 0.45 |
| BaO | 9.0 | $CeO_2$ | 0.2 |

5. A fluorine-free glass consisting essentially of the following constituents in the following quantities (expressed in percent by weight):

| | | | |
|---|---|---|---|
| $SiO_2$ | 60.34 | $ZrO_2$ | 2.1 |
| $Al_2O_3$ | 0.66 | SrO | 10.4 |
| $Na_2O$ | 6.6 | PbO | 0.3 |
| $K_2O$ | 8.6 | $Sb_2O_3$ | 0.55 |
| MgO | 0.3 | $As_2O_3$ | 0 |
| CaO | 0.4 | $TiO_2$ | 0.45 |
| BaO | 9.0 | $CeO_2$ | 0.2 |

6. A fluorine-free glass consisting essentially of the following constituents in the following quantities (expressed in percent by weight):

| | | | |
|---|---|---|---|
| $SiO_2$ | 59.8 | $ZrO_2$ | 2.2 |
| $Al_2O_3$ | 0.66 | SrO | 10.7 |
| $Na_2O$ | 6.8 | PbO | 0.3 |
| $K_2O$ | 7.8 | $Sb_2O_3$ | 0.55 |
| MgO | 0.3 | $As_2O_3$ | 0 |
| CaO | 0.4 | $TiO_2$ | 0.45 |
| BaO | 9.3 | $CeO_2$ | 0.2 |

* * * * *